United States Patent [19]

Hinrichs

[11] 4,381,537
[45] Apr. 26, 1983

[54] ILLUSIONARY WHEEL COVER STRUCTURE

[76] Inventor: David K. Hinrichs, 3232 Blaisdell Ave. S., Minneapolis, Minn. 55408

[21] Appl. No.: 337,074

[22] Filed: Jan. 4, 1982

[51] Int. Cl.³ .............................................. B60Q 1/00
[52] U.S. Cl. ........................................ 362/78; 362/184; 362/190; 362/191; 362/249; 362/251; 362/252; 362/367; 362/368; 362/806; 362/811
[58] Field of Search ................. 362/78, 184, 190, 191, 362/249, 251, 252, 367, 368, 806, 811

[56] References Cited

U.S. PATENT DOCUMENTS

| | | | |
|---|---|---|---|
| 1,739,577 | 12/1929 | Cantu | 362/78 |
| 2,526,548 | 10/1950 | Franklin | 362/78 |
| 3,113,727 | 12/1963 | Bradway | 362/78 |
| 3,155,430 | 11/1964 | Schindler | 301/37 |
| 3,694,645 | 9/1972 | Brantz | 240/10 |
| 3,767,909 | 10/1973 | Bell | 240/8 |

*Primary Examiner*—Stephen J. Lechert, Jr.
*Attorney, Agent, or Firm*—Leo Gregory

[57] ABSTRACT

An automotive accessory translucent disk wheel cover overlying a supporting plate non-rotatably mounted upon the axle of an automotive vehicle overlying a supporting plate member having mounted thereon a multiplicity of lamps in circuit individually disposed within recessed portions of said plate member, the lamps being turned on and off in a desired sequence to provide the illusion of movement such as of spokes of a wheel as viewed upon the wheel cover.

5 Claims, 7 Drawing Figures

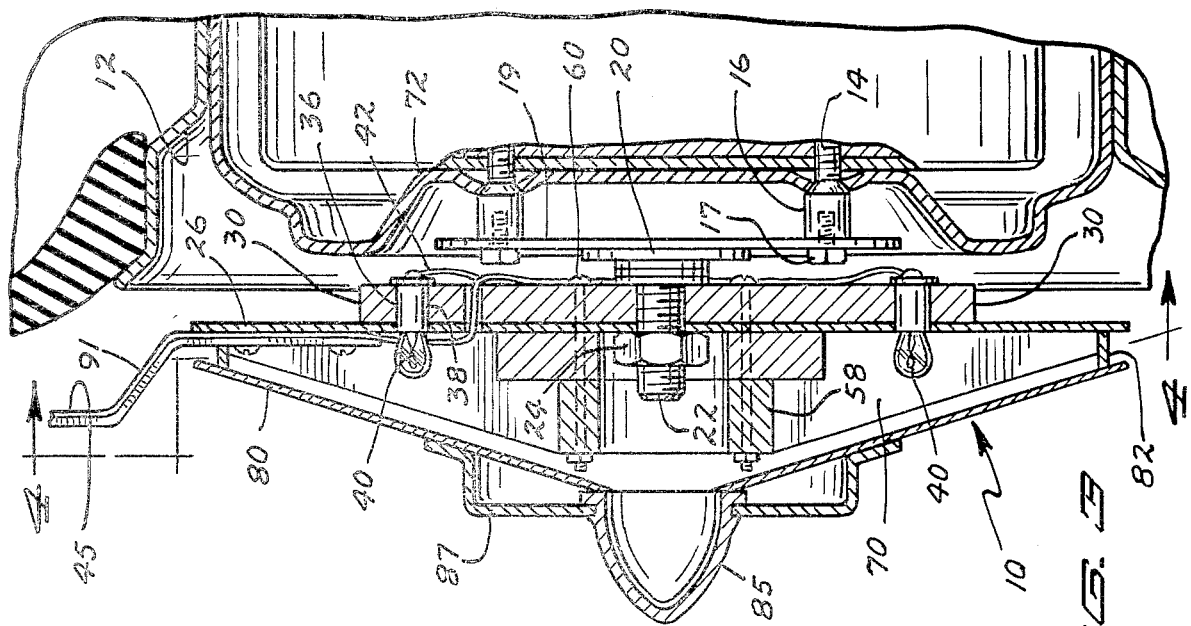
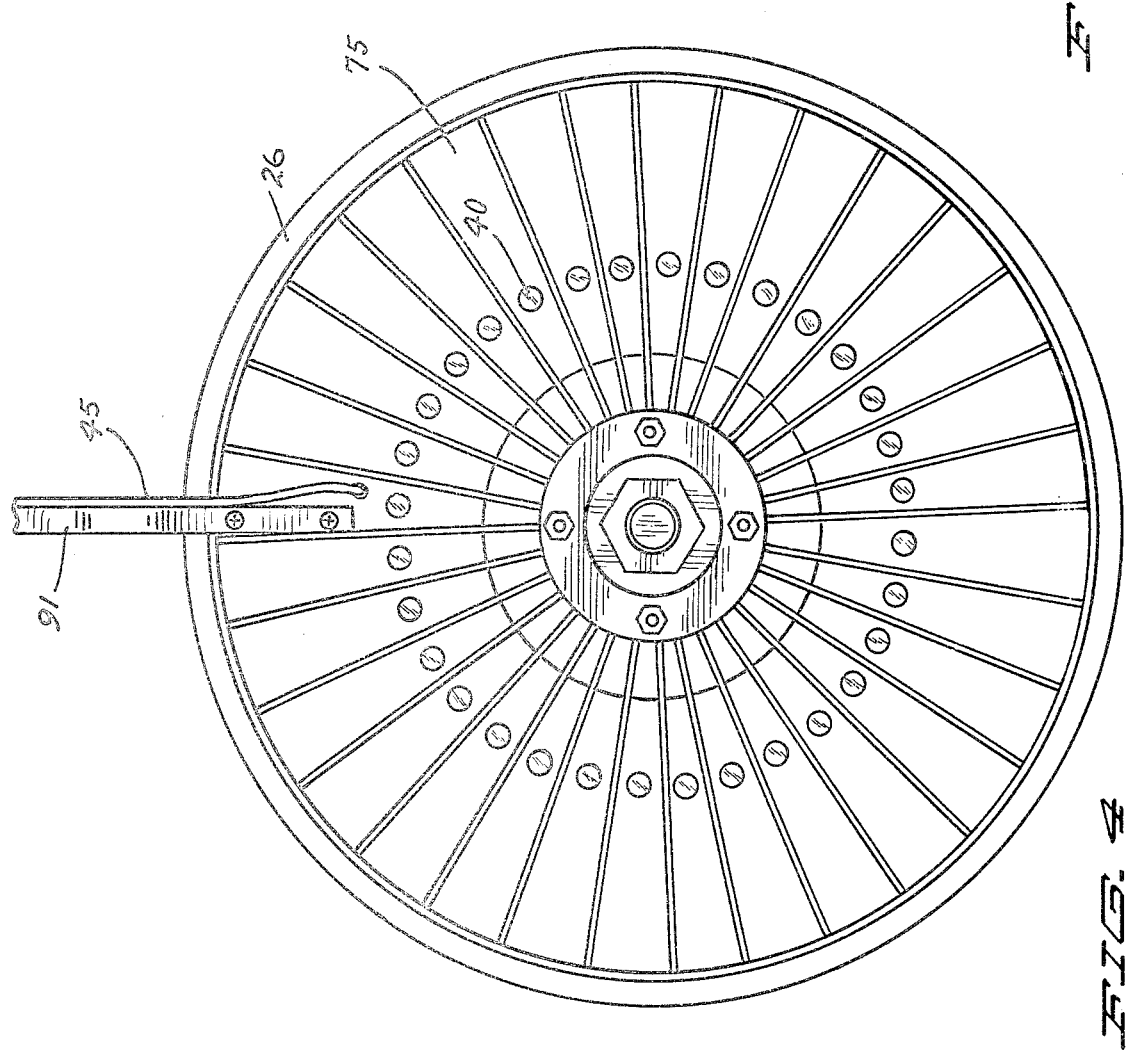

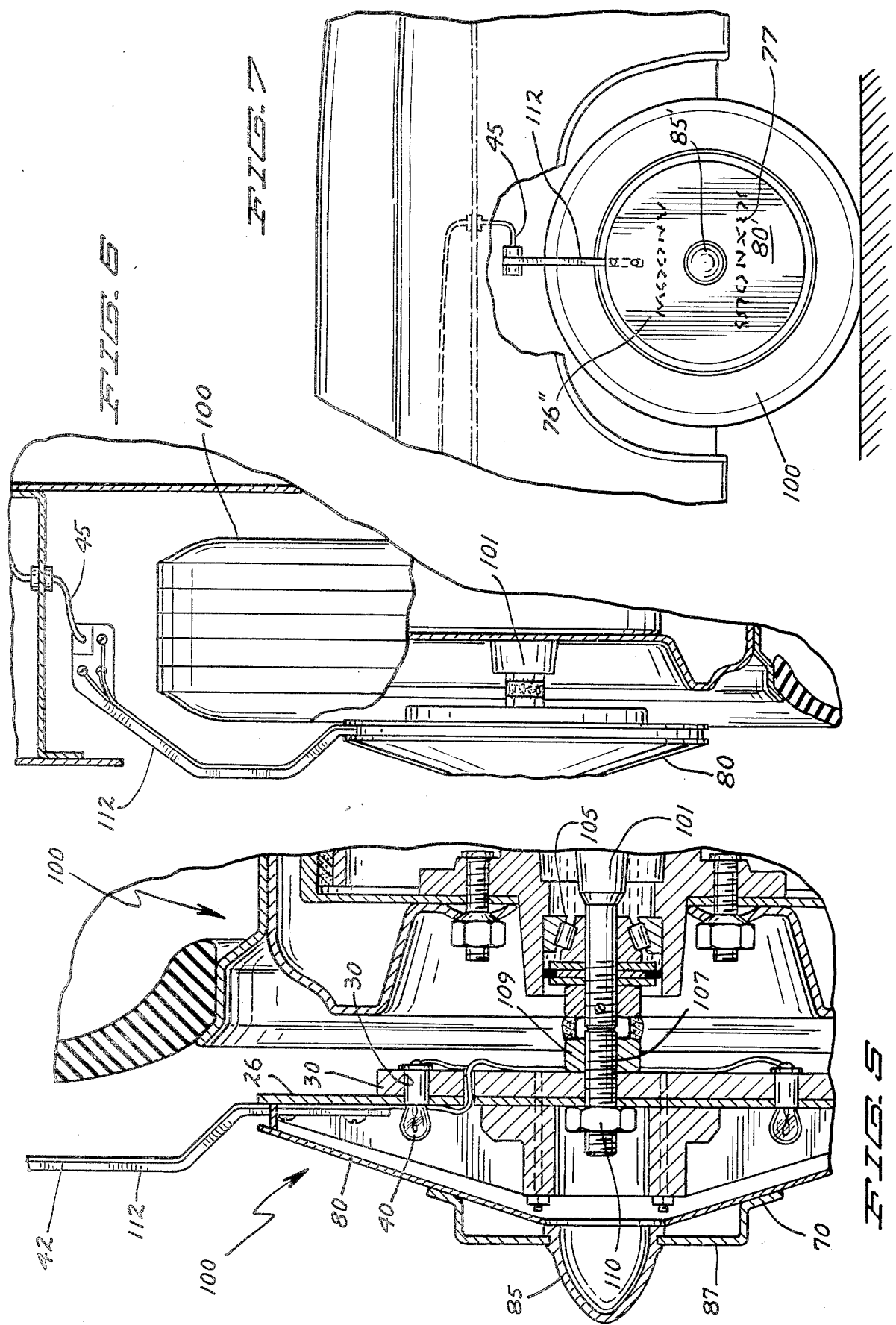

ILLUSIONARY WHEEL COVER STRUCTURE

BACKGROUND OF THE INVENTION

1. Field of the Invention.

This invention relates to ornamental automotive wheel covers providing the illusion of movement.

2. Description of the Previous Art.

Decorative illuminated wheel covers are known in the prior art including those which rotate with the wheel of the vehicle and those which are rotatable.

Known to be used are single lamps for illumination and as in U.S. Pat. No. 2,526,548 wherein an illusion of movement of light is achieved by a circular series of apertures in the wheel cover which rotate over a single lamp giving the appearance of a circular series of lights. In U.S. Pat. No. 3,155,430, a transparent cap is shown for a wheel cover overlying an arrangement of colored disks which are adapted to rotate by means of the action of the axle of the wheel.

SUMMARY OF THE INVENTION

It is an object of the invention herein to provide a translucent decorative wheel cover which will give the illusion of the movement as of spokes by means of an arrangement of lights being turned off and on in a desired sequence.

It is an object of this invention to provide a translucent wheel cover having a stationary mounting upon the wheel of an automotive vehicle and having an overlying plate member having a series of radial grooves formed therein with lamps being disposed within said grooves in sufficient depth whereby the light from one groove will not pass to another and arranging for said lamps to be turned on and off in a desired sequence giving the illusion of movement of the spokes as viewed upon the wheel cover.

More specifically, it is an object of this invention to mount a plate member upon the axle of an automotive vehicle, said munting being in such a manner that the plate member is stationary during movement of the wheel, said plate member having channels therein each having a lamp disposed therein at the peripheral portion thereof, a translucent decorative cover overlying said plate member and being carried thereby, said lamp being turned on and off in a desired sequence to create the illusion of movement as viewed through the decorative wheel cover.

These and other objects and advantages of the invention will be set forth in the following description made in connection with the accompanying drawings in which like reference characters refer to similar parts throughout the several views.

BRIEF DESCRIPTION OF THE DRAWINGS

FIG. 3 is a view in vertical cross section taken on line 3—3 of FIG. 2;

FIG. 4 is a view in vertical section taken on line 4—4 of FIG. 3 as indicated;

FIG. 5 is a view in vertical section taken on line 5—5 of FIG. 1 as indicated;

FIG. 6 is a broken view in side elevation relating to FIG. 5, and

FIG. 7 is a view in side elevation showing a detail of structure.

DESCRIPTION OF A PREFERRED EMBODIMENT

Figure 2:
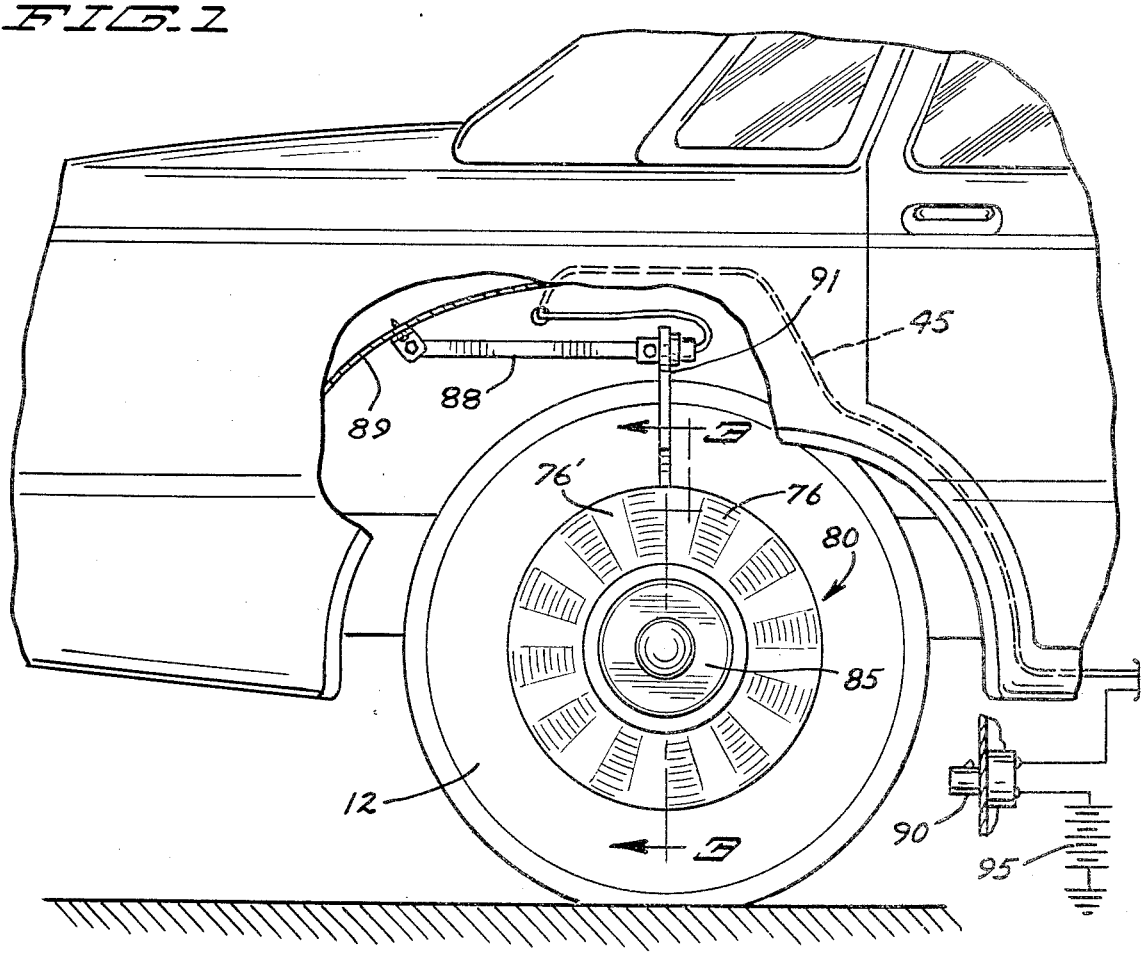
FIG. 2 is a view similar to that of FIG. 1 of the rear wheel of an automotive vehicle.

With reference to the drawings and particularly with reference to FIGS. 2, 3 and 4, the wheel cover structure comprising the invention herein is indicated generally by the reference numeral 10 and the mounting thereof is upon a driving wheel of an automotive vehicle.

Figure 1:
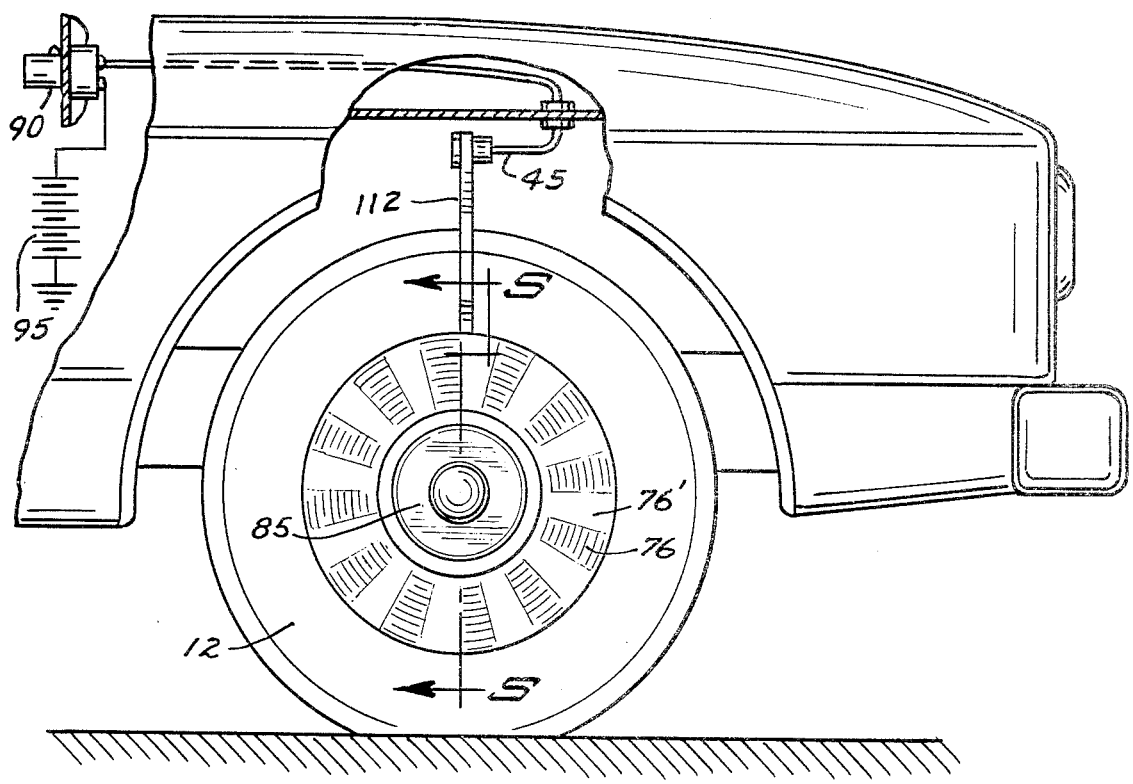
FIG. 1 is a view in elevation with some portions being broken away of the front wheel of an automotive vehicle.

A conventional type of wheel is indicated at 12 in FIG. 1 and as shown in section in FIG. 3, the same having wheel lugs 14 to which extended nuts 16 have been attached, the same being tapped to receive lock nuts 17 securing thereto a circular plate or disk member 19 of sufficient diameter to overlie said lugs. Carried centrally on said plate member 19 is a plate bearing 20 having a stud 22 extending axially therefrom. Mounted upon said stud 22 and secured by a nut 24 is a plate member 26. The diameter of said plate member 26 will be approximately the diameter of the wheel 12, that is, approximately the diameter of the rim portion of said wheel.

Mounted upon the rim or rear side of said plate member 26 and secured thereto as will be described is a circular backing plate member 30 of some thickness and having a diameter substantially less than the diameter of said plate member 26.

Said plate member 30 and the overlying plate member 26 will be drilled to receive a multiplicity of suitable electric light bulbs or lamps disposed in a circular arrangement as indicated in FIG. 4, said plate member 30 being drilled in such a way as to have holes 36 therethrough, each hole receiving a shank 38 which will form the socket for a light bulb 40. These may be of any particular number as may be desired in carrying out the concept of the invention. Said bulbs will be in circuit by lines 42 all included within the cable 45, which is indicated in FIG. 2, running to a power source such as the battery indicated at 95 and being in circuit with a drum switch 90. The circuit may be variously designed to cause said lamps to be turned on and off in any desired sequence, all of which circuitry is well known in the art and requires no further explanation or description herein and none is given.

Projecting outwardly of said plate member 26 is a stepped projecting recessed hub portion 58 of reduced diameter, saud hub portion being secured to the plate member 30 by the bolts 60.

Disposed about said hub portion 58 is a circular plate member 70 which in radial vertical section is inclined in the direction of its periphery and as here illustrated is formed to have radially disposed channels 75. Said channels are of such a depth as to receive therein the lamps 40 and have said lamps recessed therein sufficiently as not to illuminate an adjacent channel. It is within the scope herein to have various configured indentation or recesses in said plate member 70 to accomplish a like purpose.

Overlying said member 70 in close proximity thereto and in conforming to the cross sectional configuration thereof is an outer cover plate member 80 made of a suitable translucent material, such as a suitable plastic material. Said plate member 80 is spaced from said member 70 by a recessed peripheral wall 82 which in a suitable manner secures together the plate member 80 and the plate member 26. Projecting axially of said plate member 80 is a translucent hub portion 85 having as here shown a bracket 87 in connection therewith and the same will be secured to the plate member 80 in any suitable manner. Said hub portion may be variously formed.

As indicated in FIG. 2, a bracket member 88 of suitable design is secured to a convenient fender frame member 89 and will have an arm thereof indicated at 91 secured to a peripheral portion of the plate member 26 to hold the plate member 26 in a steady non-rotating position when the wheel 12 is in rotation. Further, the cable 45 is shown schematically running to a suitable switch member such as the drum switch 90 which will be suitable located as upon the dashboard of the vehicle and said switch is indicated as running to the vehicle power source 95.

OPERATION

In operation, the circuitry including the lamps 40 and the drum switch 90 will be arranged to have said lamps become lit and unlit in a desired sequence, such as in successive individual lamps or pairs of lamps or in a sequence wherein spaced individual or groups of lamps may be lit and unlit to create a desired effect. The arrangement of the circuit to attain a desired effect is known in the art, hence, no description thereof is herein given.

In the particular structural arrangement described, the lamp mounting plate members 26 and 30 carried by the plate bearing 20 are held in a stationary position by the bracket 88 and its arm 91. The sequential arrangement of the lamps 40 in becoming lit and unlit causes the channels 75 to appear as moving spokes as indicated at 76 as seen through the plate member 80 giving the illusion of a rotating wheel whether in fact the wheel is stationary or in rotation. The lighted or lit area of the cover plate member 80 as seen therethrough is indicated by the reference numeral 76'. The appearance of movement is caused by the channels going from a dark unlighted condition to a lighted condition. Suitable legends may appear upon said plate member 80 in keeping with the imaginative effort which may be exercised by the operator. The result has significant eye catching appeal both for merely ornamental purposes and for commercial advertising purposes.

The entire mounting and installation of the device herein is readily accomplished without the requirement for the use of a particularly skilled person or an auto mechanic. The whole operation is controlled by said drum switch 90 which will be conveniently located upon or under the dashboard of the vehicle and the switch may selectively operate one or more lighting arrangements.

MODIFICATION

Referring to FIGS. 1, 5 and 6, a modification of the above described structure is shown in which the structure above described is mounted upon a non-driving wheel of a vehicle and as in the case here, upon the front wheel 100 of a vehicle. Parts above described will be indicated by like reference numbers.

With particular reference to FIGS. 5 and 6, the axle 101 of said wheel is shown and in FIG. 5, the wheel bearing is indicated as 105. Said axle is extended by a stud 107 secured to said axle by an appropriate lock nut 109. This may be accomplished in various known ways. Carried on said stud secured by a nut 110 is plate member 26 having the plate member 30 mounted thereunder as described above and said plates are drilled to have a circular arrangement of holes 36 to carry the lamps 40 in a manner as indicated in FIGS. 4 and 5.

The lines 42 in circuit with said lamps and forming the cable 45 is, as above described, connected to a drum switch 90 which is connected to a power source 95.

A steady rest bracket 112 extends upwardly of plate member 26 to support the cable 45 which extends upwardly through the body of the vehicle to a position upon or under the dashboard of the vehicle as above described.

The operation herein is as that above described. However, an alternate lighting effect is achieved with all of the lamps being lit illuminating the entire cover plate member here indicated at 80' and the hub 85' and with the total illumination cover plate being indicated by 76".

Here for added effect, indicia 77 has been applied to said cover plate 80'. With total illumination, there is no discernible appearance of the channel members 75 upon said cover plate member 80'.

The invention as disclosed herein has been very successful in creating an eye catching attraction.

It will of course be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

I claim:

1. An illusionary movement wheel cover for an automative vehicle, having in combination
    a translucent wheel cover for an automative vehicle,
    non-rotatable axle supported means carrying said wheel cover,
    said means comprising
    an axle extension,
    a plate member carried by said axle extension having radially disposed channels therein underlying said wheel cover,
    lamps respectfully recessed in said channels,
    a circuit including said lamps,
    switching means and a line to a power source,
    said circuit being arranged and constructed to sequentially turn on and turn off said lamps in a desired sequence, and
    said channels appearing through said cover giving the appearance of a rotatable movement of said wheel cover as said lamps are turned on and turned off.

2. The structure set forth in claim 1, wherein said axle extension includes a plate bearing which forms a non-rotatable interface,
    said plate member being carried by said bearing,
    a steady-rest member extending from said cover member to a body member of said vehicle,
    a switch carried within said vehicle determining the sequential arrangement of turning on and turning off said lamps, and
    a line connecting said switch to said power source.

3. The structure set forth in claim 1, wherein
    said radially disposed channels having a depth such that a lamp turned on in a channel will not light up an adjacent channel.

4. The structure set forth in claim 1, wherein
    said translucent wheel cover bears indicia thereon.

5. An illusionary movement wheel cover of an automative vehicle, having in combination
a translucent wheel cover member,
means carrying said wheel cover member being non-rotatably supported,
means forming an extension of an axle of said vehicle supporting said last mentioned means,
a plate member underlying said wheel cover having radially disposed channels therein,
said channels increasing in depth in the direction of the periphery of said plate member,
lamps being respectively recessed in said channels,
a circuit including said lamps,
switching means and a line to a power source included in said circuit,
said switching means being particularly arranged and constructed to turn on and turn off said lamps in various sequential arrangements, and
said channels in which lamps have been turned off appearing through said cover by contrast to adjacent lighted channels as if spokes of a wheel giving the appearance of rotatable movement as said lamps are sequentially turned on and turned off.

* * * * *